(12) United States Patent
Cai et al.

(10) Patent No.: US 9,380,168 B2
(45) Date of Patent: Jun. 28, 2016

(54) FRONT-END CHARGING SYSTEM THAT GENERATES CHARGING DATA PER ENTITY HAVING A REVENUE SHARE

(75) Inventors: Yigang Cai, Naperville, IL (US); Xiangyang Li, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 808 days.

(21) Appl. No.: 13/320,230

(22) PCT Filed: Jun. 30, 2009

(86) PCT No.: PCT/US2009/049255
§ 371 (c)(1),
(2), (4) Date: Nov. 11, 2011

(87) PCT Pub. No.: WO2011/002450
PCT Pub. Date: Jan. 6, 2011

(65) Prior Publication Data
US 2012/0088469 A1     Apr. 12, 2012

(51) Int. Cl.
*H04M 11/00* (2006.01)
*H04M 15/00* (2006.01)
*H04W 4/24* (2009.01)

(52) U.S. Cl.
CPC .............. *H04M 15/00* (2013.01); *H04M 15/41* (2013.01); *H04M 15/44* (2013.01); *H04M 15/50* (2013.01);
(Continued)

(58) Field of Classification Search
CPC ....... H04W 4/24; H04W 12/06; H04W 4/005; H04W 4/26; H04W 24/08; H04W 8/18; H04W 4/003; H04W 88/16; H04W 8/04; H04W 12/12; H04W 24/00; H04L 12/1407; H04L 65/1016; H04L 12/14; H04L 12/1403; H04L 12/1425; H04L 65/1006; H04L 67/22; H04M 15/65; H04M 15/66; H04M 15/64; H04M 15/41; H04M 15/8038; H04M 15/61; H04M 15/43

USPC ........ 455/406, 422.1, 405, 408, 456.1, 432.1, 455/410, 552.1; 370/259; 379/32.01, 114.2, 379/220.01; 726/1, 4; 705/30
See application file for complete search history.

(56) References Cited

U.S. PATENT DOCUMENTS

2004/0125755 A1 *  7/2004  Roberts ........................ 370/259
2004/0224662 A1   11/2004  O'Neil et al.
(Continued)

FOREIGN PATENT DOCUMENTS

| EP | 1320214 A1 | 6/2003 |
|----|------------|--------|
| EP | 1545114 A1 | 6/2005 |
| WO | WO03/017065 A2 | 2/2003 |

OTHER PUBLICATIONS

Xian Yan Li et al: "Converged network common charging controller function" Bell Labs Technical Journal, Wiley, CA, US, vol. 13, No. 2, Jun. 21, 2008, pp. 161-183, XP001514359, ISSN: 1089-7089, p. 167-179, figures 4-15.

(Continued)

*Primary Examiner* — Fred Casca
(74) *Attorney, Agent, or Firm* — Duft Bornsen & Fettig, LLP (57) ABSTRACT

Charging systems and methods are disclosed for determining the share of call revenue for multiple entities. One embodiment comprises a charging controller that is coupled to a mobile network and an online charging system. The charging controller receives charging data for a call in the mobile network, and processes the charging data and charging rules to identify entities that have a share in revenue for the call. The charging controller generates a charging request message indicating the entities having a revenue share in the call, and transmits the charging request message to the online charging system to cause the online charging system to determine the revenue share for each of the entities.

20 Claims, 7 Drawing Sheets

(52) U.S. Cl.
CPC .............. *H04M 15/53* (2013.01); *H04M 15/54* (2013.01); *H04M 15/55* (2013.01); *H04M 15/57* (2013.01); *H04M 15/59* (2013.01); *H04W 4/24* (2013.01); *H04M 2215/0104* (2013.01); *H04M 2215/0164* (2013.01); *H04M 2215/0172* (2013.01); *H04M 2215/204* (2013.01); *H04M 2215/208* (2013.01); *H04M 2215/2026* (2013.01); *H04M 2215/2046* (2013.01); *H04M 2215/52* (2013.01)

(56) References Cited

U.S. PATENT DOCUMENTS

| | | | | |
|---|---|---|---|---|
| 2007/0036312 A1* | 2/2007 | Cai | ................. | H04M 15/00 379/126 |
| 2007/0201361 A1* | 8/2007 | Kumar et al. | ................. | 370/230 |
| 2007/0242816 A1* | 10/2007 | Cai | ................. | H04M 15/00 379/127.05 |
| 2008/0125082 A1* | 5/2008 | Salo | ................. | H04L 12/14 455/406 |
| 2008/0319884 A1* | 12/2008 | Yi | ................. | G06Q 30/04 705/34 |

OTHER PUBLICATIONS

Maria Koutsoupoulou: "A platform for charging, billing and accounting in future mobile networks" Jan. 24, 2005, XP002574421 Retrieved from the Internet: URL:http://cgi.di.uoa.gr/{mkoutstop/data/Koutsopoulou_NGNM2004_almost_final.pdf>[retrieved on Mar. 23, 2010]paragraph [0003]-paragraph0005].

Anonymous: "Telecommunications and Internet Converged Services and Protocols for Advanced Networking (TISPAN); NGN Management; Charging Specification for Release 1; Draft ETSI DTS 02032" ETSI Standards, Lis, Sophia Antipolis Cedex, France, vol. TISPAN, n. Version 1, Oct. 1, 2005, XP014031462 ISSN: 0000-0001.

\* cited by examiner

FIG. 6

FRONT-END CHARGING SYSTEM THAT GENERATES CHARGING DATA PER ENTITY HAVING A REVENUE SHARE

RELATED APPLICATIONS

This application is the National Stage under 35 U.S.C. 371 of International Application No. PCT/US2009/049255, filed Jun. 30, 2009, which is incorporated by reference herein.

BACKGROUND

1. Field of the Invention

The invention is related to the field of communication networks and, in particular, to charging and billing in communication networks.

2. Statement of the Problem

When a phone call is placed over a communication network, there may be multiple entities that share in the revenue received for the call. For instance, the network operator that actually operates and maintains the network over which the call is placed shares in the revenue. If the call extends to a foreign communication network, such as for an international call, then the network operator of the foreign communication network shares in the revenue for the call. If a call extends to a roaming mobile user, then the network operator of the mobile network in which the user is roaming shares in the revenue. The process of determining which entities share in the revenue of a call is sometimes referred to as mediation.

In traditional communication networks, charging functions for calls are performed by network components, such as switches. Switches collect charging data for the calls, and generate Charging Detail Records (CDR) that include the charging data. Switches all over the entire network forward the CDRs to a billing system in service provider's IT system (often referred to as a back-end or back-office billing system). The back-office billing system stores information that may be used for the mediation process. For example, the billing system stores agreements that a network operator may have with a foreign network operator for international calls, stores agreements that a network operator may have with mobile networks for roaming scenarios, etc. The billing system also performs settlement processes to invoice customers for the telephone services, and to provide vouchers or credits to other entities.

In more recent charging architectures, postpaid charging is implemented through an Offline Charging System (OFCS) and an associated billing system. Similarly, prepaid charging is implemented through an Online Charging System (OCS) and an associated billing system. To provide offline and online charging, the OCS and the billing systems each maintain their own rating engine. Also, the billing systems each maintain profiles for the subscribers, profiles for the wholesale customers, and profiles for other network operators having contractual agreements. The overlap of the rating engines and the profiles wastes significant resources in the network. Operational inefficiencies and technical overhead for maintaining two separate charging systems may lead to the drawback in marketing and business activities for a network operator. Presently, the network operators are subject to great pressures to reduce the operational costs.

SUMMARY

Embodiments described herein are able to manage the flow of revenue to the appropriate entities for a call using a converged charging system. The converged charging system centralizes prepaid charging, postpaid charging, interconnect charging, wholesale charging, content charging, roaming charging, etc. Thus, revenues for a call may be divided among multiple entities based on the applicable charging types. This will significantly reduce the work in the back office, and create near real-time billing. The converged charging system also enables the rating or billing-related activity to share a common rating engine and a common account balance management function, which reduces the cost for system deployment, operation, and maintenance.

One embodiment comprises a charging controller that is coupled to a mobile network and an online charging system. The charging controller is operable to receive charging data for a call in the mobile network, and to process the charging data for the call and charging rules to identify entities that have a share in revenue for the call. The charging controller is further operable to generate a charging request message indicating the entities having a revenue share in the call, and to transmit the charging request message to the online charging system to cause the online charging system to determine the revenue share for each of the entities.

In another embodiment, the online charging system is operable to receive the charging request message from the charging controller, and to identify a profile for each of the entities having a revenue share. The online charging system is further operable to determine a revenue share amount for each of the entities based on their profile and a rating, to generate charging records indicating the revenue share amount for each of the entities, and to transmit the charging records to the charging controller.

In yet another embodiment, the charging controller is further operable to receive the charging records, to correlate the charging records to generate a consolidated charging record that indicates the revenue share amount for each of the entities, and to transmit the consolidated charging record to a billing system.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
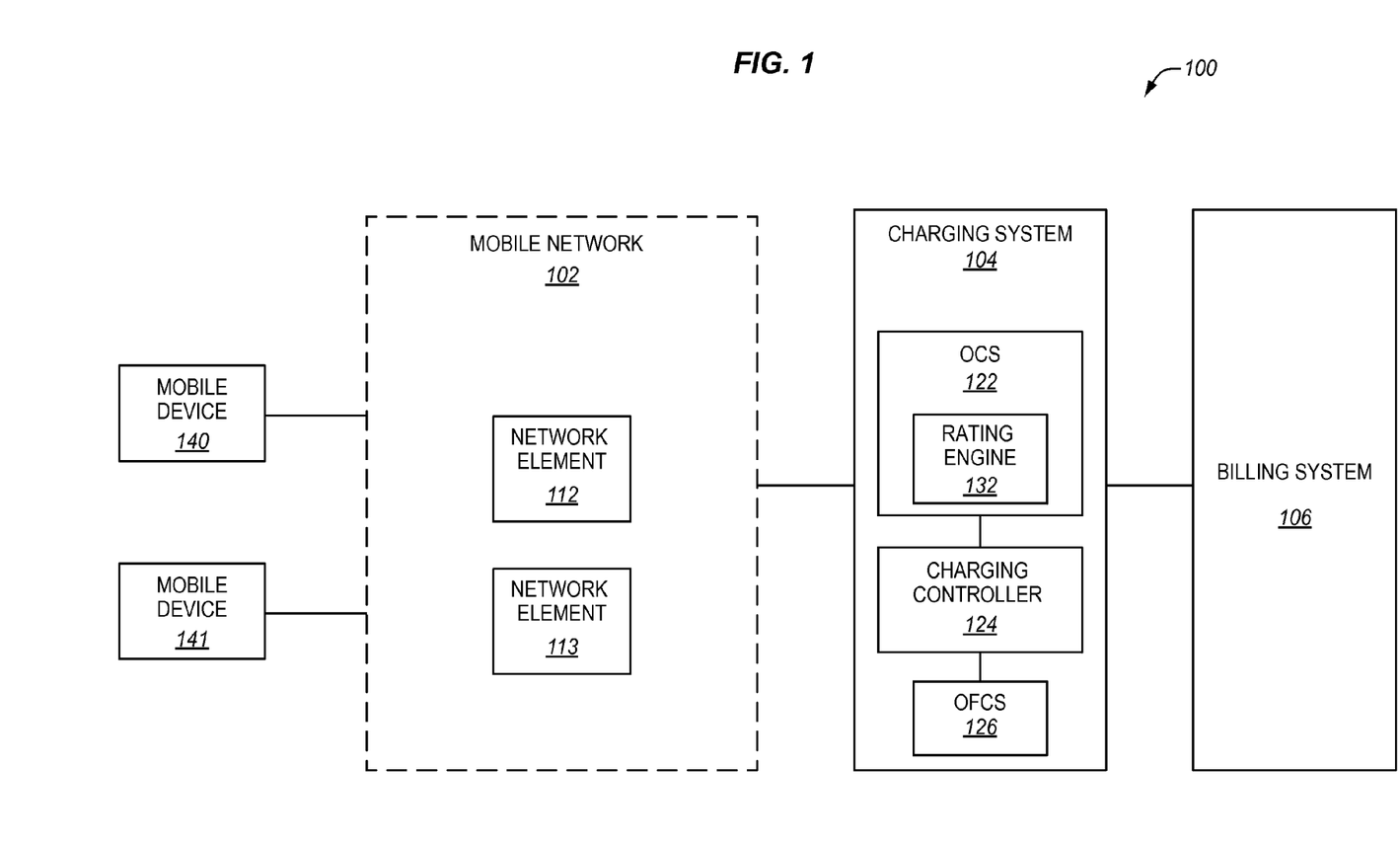
FIG. 1 illustrates a communication network in an exemplary embodiment.

FIG. 1 illustrates a communication network 100 in an exemplary embodiment. Communication network 100 includes a mobile network 102, a charging system 104, and a billing system 106. Mobile network 102 may comprise a circuit-based network, such as a CDMA network or a GSM network, may comprise a packet-based network, such as an IP Multimedia Subsystem (IMS) network, or a mix of the two. Mobile network 102 is able to provide service to mobile devices 140-141 to place voice calls, to initiate data sessions, to send or receive text messages or multimedia messages, etc. Mobile network 102 includes a plurality of network elements 112-113 that are operable to serve a session/call or provide a service for a session/call within mobile network 102. For example, network element 112 may comprise a Serving-Call Session Control Function (S-CSCF) while network element 113 may comprise an application server (AS) in an IMS network. Alternatively, network element 112 may comprise a Mobile Switching Center (MSC) while network element 113 may comprise an SGSN of a UMTS network.

Charging system 104 comprises any system, server, or function operable to provide online and/or offline charging for sessions/calls in mobile network 102. For the online/offline charging, charging system 104 is able to generate consolidated charging records for sessions/calls within mobile network 102, and send the CDRs to billing system 106. Charging system 104 includes an online charging system (OCS) 122, a charging controller 124, and an offline charging system (OFCS) 126. OCS 122 includes a common rating engine 132 that may be shared by OCS 122 and OFCS 126, and may include other functions that are not shown. OFCS 126 may also include a variety of functions that are not shown for the sake of brevity, such as a Charging Data Function (CDF)/Charging Gateway Function (CGF) as defined by the 3GPP in Release 6, or a Charging Collector Function (CCF) as defined by the 3GPP in Release 5.

Billing system 106 comprises any system, server, or function operable to receive a consolidated charging record for a session/call, and to invoice one or more customers for the session/call based on the consolidated CDR or issue a voucher or credit.

For a call, there may be a variety of different types of charging involved. Some common types of charging are as follows. One type of charging is referred to as retail charging. Retail charging occurs between a mobile network operator (MNO) or a mobile virtual network operator (MVNO) and an end user. Thus, retail charging defines how end users pay for services provided by the MNO (or MVNO).

Another type of charging is referred to as wholesale (or MVNO) charging. Wholesale charging occurs between an MVNO and an MNO. A wholesale customer purchases mobile products and services from an MNO for resale. Wholesale charging defines how the MVNO pays for services provided by the MNO. Another type of charging is referred to as content charging. Content charging occurs between a content provider and an MNO (or MVNO). The content provider supplies some content/service to end users via the MNO/MVNO network. Thus, content charging defines how the MNO/MVNO pays for the content supplied by the content provider.

Another type of charging is referred to as interconnect charging. Interconnect charging occurs between an MNO and another network operator. When a call is originated in the MNO's network but is terminated in network of the other operator (or vice-versa), interconnect charging defines how the MNO pays for services provided by the other network operator.

Another type of charging is referred to as roaming charging. Roaming charging occurs between an MNO and other MNO that is serving a roaming user. When an end user of one MNO (visiting MNO) is roaming in the network of another MNO (visited MNO), roaming charging defines how the visiting MNO pays for services provided by the visited MNO.

There may be other types of charging that apply to the description provided below. One common thread for each of these charging types is that multiple entities will share in the revenue of a call. Thus, the revenue has to be divided at some point and allocated appropriately to each of the entities. In a traditional charging architecture, a charging system generates CDRs that include charging data for a call. A back-office billing system then processes the charging data from the CDRs to divide the revenue for the call to entities that have a share. Thus, the revenue is divided in back-office systems instead of in the actual charging system. In the embodiments described below, a new charging controller 124 is implemented in the charging architecture to divide the revenue. Thus, revenue sharing entities for a call are identified in charging system 104 instead of in back office systems.

Assume for this embodiment that mobile device 140 is involved in a call over mobile network 102. One or both of network elements 112-113 may provide a service for the call, and generate charging data for providing the service. Those skilled in the art will appreciate that other mobile networks (not shown) and other fixed networks (not shown) may also be involved in the call. Network elements 112-113 then transmit the charging data to charging system 104. For example, if prepaid charging applies for the call, then network elements 112-113 may transmit a Diameter Ro Credit Control Request (CCR) to charging system 104. If postpaid charging applies for the call, then network elements 112-113 may transmit a Diameter Rf Accounting Request (ACR) to charging system 104. Charging controller 124 manages charging for the call as is illustrated in FIG. 2.

Figure 2:
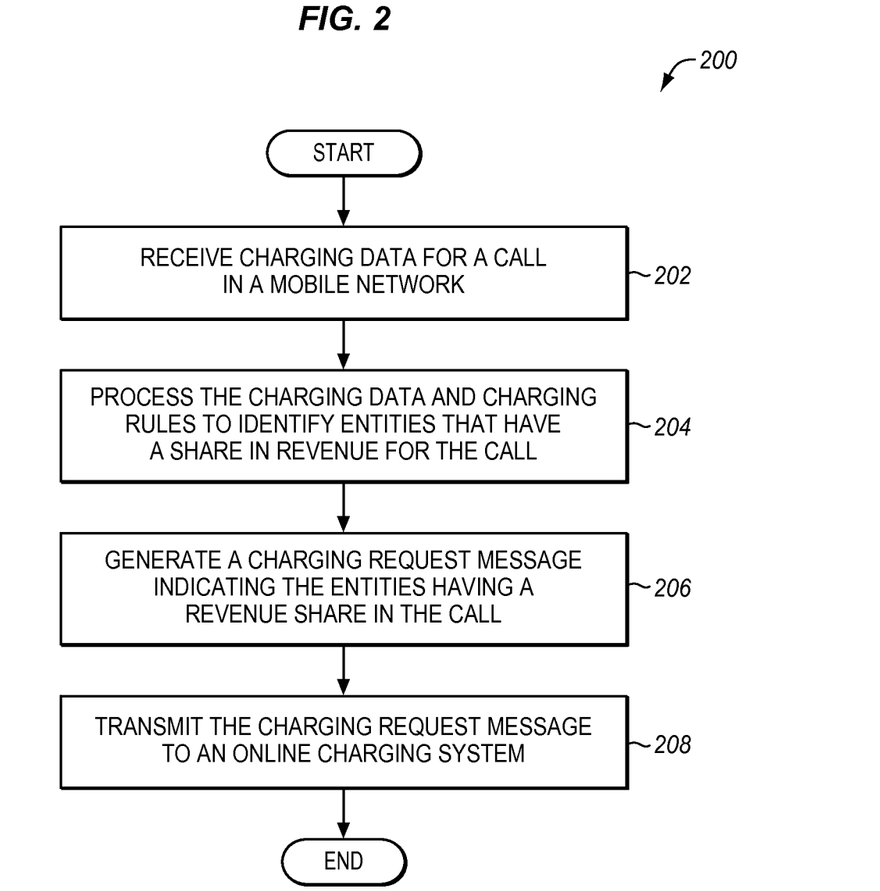
FIG. 2 is a flow chart illustrating a method of charging for a call by generating charging data for each entity having a revenue share in an exemplary embodiment.

FIG. 2 is a flow chart illustrating a method 200 of charging for a call by generating charging data for each entity having a revenue share in an exemplary embodiment. The steps of method 200 will be described with reference to communication network 100 in FIG. 1, but those skilled in the art will appreciate that method 200 may be performed in other networks and systems. The steps of the flow charts described herein are not all inclusive and may include other steps not shown. The steps may also be performed in an alternative order.

In step 202, charging controller 124 receives charging data for the call in mobile network 102. The charging data may be received in a charging request message from mobile network 102, such as a Diameter Ro CCR or a Diameter Rf ACR. Alternatively, the charging data may be received in a CDR from OCS 122 or OFCS 126. In step 204, charging controller 124 processes the charging data for the call and charging rules to identify entities that have a share in revenue for the call. Charging controller 124 stores charging rules that define conditions for different types of charging. For example, the charging rules may include retail rules defining conditions for retail charging. The charging rules may include wholesale rules defining conditions for wholesale charging. The charging rules may include interconnect rules defining conditions for interconnect charging. The charging rules may include content rules defining conditions for content charging. The charging rules may include roaming rules defining conditions for roaming charging.

As an example, charging controller 124 may process the calling party number and wholesale rules to determine that wholesale charging applies, and to determine the identity of the wholesale entity. Charging controller 124 may also process the called party number and interconnect rules to determine that interconnect charging applies, and to determine an identity of the network operator entity providing the interconnect service. Based on the charging data, charging controller 124 is able to generate a list of entities that have a share in the revenue for the call.

In step 206, charging controller 124 generates a charging request message indicating the entities having a revenue share in the call. For example, charging controller 124 may generate a Diameter Ro CCR, and insert the identities of the revenue sharing entities in the CCR. In step 208, charging controller 124 transmits the charging request message to OCS 122. Charging controller 124 may transmit a separate charging request message for each of the identified revenue sharing entities, or may transmit a single charging request message for all of the identified revenue sharing entities. Based on the data included in the charging request message, OCS 122 is able to determine the revenue share for each of the entities, which is further illustrated in FIG. 3.

Figure 3:
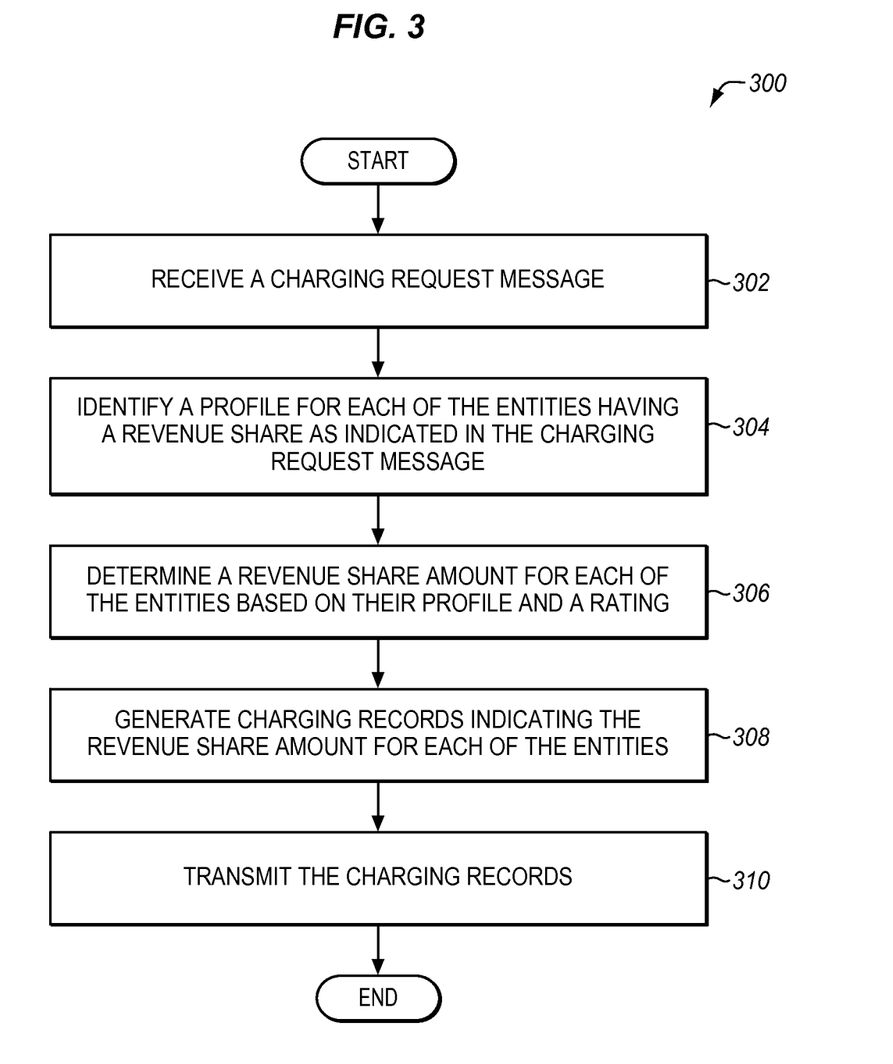
FIG. 3 is a flow chart illustrating a method of determining the revenue share for multiple entities in an exemplary embodiment.

FIG. 3 is a flow chart illustrating a method 300 of determining the revenue share for multiple entities in an exemplary embodiment. The steps of method 300 will be described with reference to communication network 100 in FIG. 1, but those skilled in the art will appreciate that method 300 may be performed in other networks and systems. In step 302, OCS 122 receives the charging request message from charging controller 124. In step 304, OCS 122 identifies a profile for each of the entities having a revenue share as indicated in the charging request message. OCS 122 may maintain a database of profiles for each entity. For example, OCS 122 may maintain a profile for mobile device 140 that indicates a service plan subscription of its end user. OCS 122 may maintain a profile of other MNO's having a roaming agreement with the operator of mobile network 102. OCS 122 may maintain a profile of fixed networks having an interconnect agreement with the operator of mobile network 102. OCS 122 may also maintain a profile of content providers having an agreement to supply content to end users of mobile network 102. Alternatively, the profiles may be maintained on an external database that is accessible to OCS 122.

In step 306, OCS 122 determines a revenue share amount for each of the entities based on their profile and a rating provided by rating engine 132. For example, assume that overall charging for a call is $30. Based on the profiles and the ratings, OCS 122 may determine that entity 1 shares $10 of the revenue, entity 2 shares $10 of the revenue, and entity 3 shares $10 of the revenue. In step 308, OCS 122 generates charging records, such as a CDR, indicating the revenue share amount for each of the entities. For example, OCS 122 may generate an individual charging record for each of the entities indicating the amount the entity is owed or the amount payable to the entity. OCS 122 then transmits the charging records to charging controller 124 in step 310.

The charging records generated by OCS 122 include a new set of data for each revenue sharing entity. The new set of data includes an entity ID, which may be an end user subscriber ID, an MNO ID, an MVNO ID, a content provider ID, another network operator ID, etc. The new set of data also includes a charging type, such as retail charging, wholesale charging, content charging, interconnect charging, roaming charging, etc. The new set of data also includes a revenue share amount. The revenue share amount indicates the monetary amount of service usage owed by each entity or payable to each entity. The revenue share amount may be an accumulated amount per payment billing cycle, or a special call charge amount. For retailing charging, the revenue share amount represents the service units the end user pays to the MVNO/MNO. For wholesale charging, the revenue share amount represents the service units the MVNO pays to the MNO for network/service usage. For content charging, the revenue share amount represents the service units the MNO pays for the content supplied by the content provider. For interconnect charging, the revenue share amount represents the service units the MNO pays for the other network operator that interconnects the call. For roaming charging, the revenue share amount represents the service units the visiting MNO pays to the visited MNO for a local user to roam in a foreign network.

Figure 4:
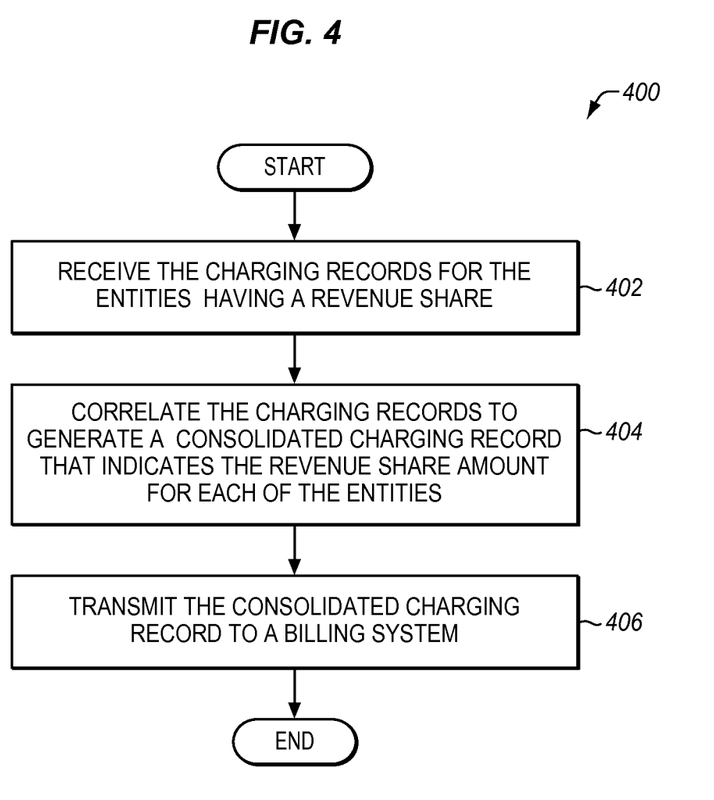
FIG. 4 is a flow chart illustrating a method of correlating charging records in an exemplary embodiment.

FIG. 4 is a flow chart illustrating a method 400 of correlating charging records in an exemplary embodiment. The steps of method 400 will be described with reference to communication network 100 in FIG. 1, but those skilled in the art will appreciate that method 400 may be performed in other networks and systems. In step 402, charging controller 124 receives the charging records for the entities having a revenue share. In step 404, charging controller 124 correlates the charging records to generate a consolidated charging record that indicates the revenue share amount for each of the entities. The consolidated charging record also includes the new set of data for each revenue sharing entity, such as entity ID, charging type, and revenue share amount. In step 406, charging controller 124 transmits the consolidated CDR to billing system 106.

Billing system 106 may then perform a settlement process based on the data included in the consolidated charging record to generate billing invoices and generate vouchers or credits for each revenue sharing entity. Because charging controller 124 has already divided the revenue for the call in the consolidated charging record, billing system 106 does not need to perform this process. Billing system 106 only needs to issue the vouchers to the proper entities for the revenue share amounts indicated in the consolidated charging record.

EXAMPLES

Figure 5:
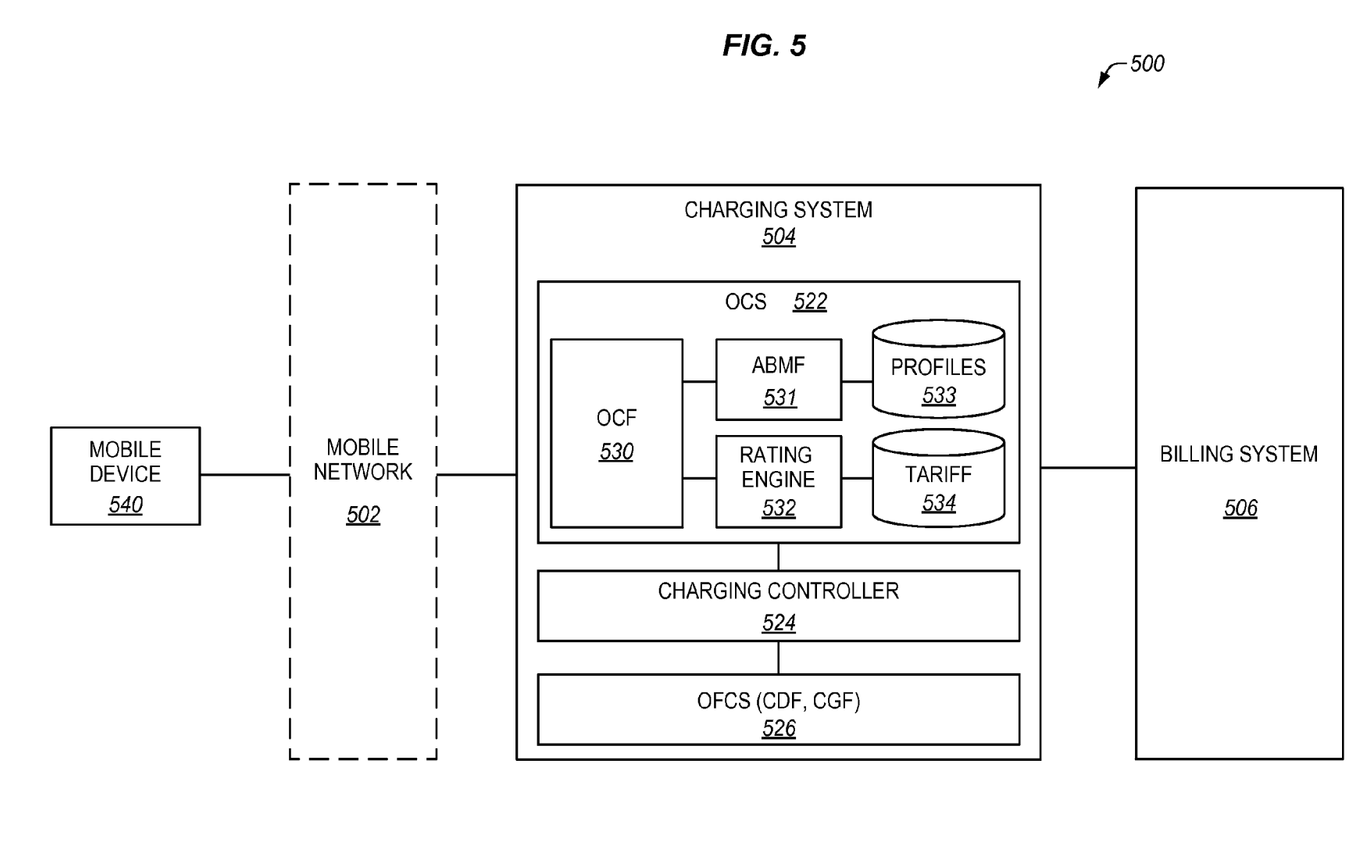
FIG. 5 illustrates another communication network in an exemplary embodiment.

FIG. 5 illustrates another communication network 500 in an exemplary embodiment.

Communication network 500 includes a mobile network 502, a charging system 504, and a billing system 506. Mobile network 502 is able to provide service to mobile device 540 to place voice calls, to initiate data sessions, to send or receive text messages or multimedia messages, etc. Charging system 504 includes an online charging system (OCS) 522, a charging controller 524, and an offline charging system (OFCS) 526.

OCS 522 handles online charging (or prepaid) for calls in mobile network 502. OCS 522 includes an online charging function (OCF) 530, an account balance management function (ABMF) 531, a rating engine 532, a profile database 533, and a tariff database 534. OCS 522 is enhanced to perform multiple-event charging based on one request event (i.e., a CCR). OCS 522 will use the different subscription IDs of the request to access each account profile separately, so OCS 522 will rate the call charge for each entity. After charging is finished, OCS 522 will generate a CDR indicating each entity's call cost, such as for retail charging, wholesale charging, content charging, interconnect charging, roaming charging, etc.

OCF 530 comprises any system, server, or function operable to manage online charging in OCS 522 by accessing ABMF 531 and rating engine 532, exchanging charging messages with network elements in mobile network 502, and performing other functions. ABMF 531 comprises any system, server, or function operable to maintain accounts for users, and more particularly to maintain an amount of service units in the accounts of the users. Rating engine 532 comprises any system, server, or function operable to determine the cost of service usage according to a tariff defined by the network operator. Rating engine 532 will perform tariff plan determination by accessing the tariff index of each entity, such as a unit determination, a price determination, a tariff determination, a counter, etc.

Rating engine 532 will not only hold the retail tariff plan for end user's service usage, but also holds the tariff plan for MNO's partnership, such as the price plan with MVNO, content provider, or other operators based on the service level agreement. OCF 530 will use the price plan index in each retail/partner's account profile to access the tariff to determine each entity's call charge.

Profile database 533 comprises any database or data structure operable to store profiles for retail customers, wholesale customers, content providers, interconnect operators, roaming operators, etc. Profile database 533 may alternatively store addresses for the profiles in order to remotely access the profiles. Tariff database 534 comprises any database or data structure operable to store a tariff plan or tariff plan index. Rating engine 532 is able to perform a tariff plan determination by accessing the tariff plan data of an entity, such as a unit determination, a price determination, a tariff determination, a counter, etc. OCF 530 will use the price plan index in each retail/partner's account profile to access the rating tariff index to determine each entity's call charge.

OFCS 526 handles offline charging (or postpaid) for calls in mobile network 502. OFCS 526 may include a Charging Data Function (CDF), a Charging Gateway Function (CGF), or other charging elements which are not specifically shown in FIG. 5.

Charging controller 524 comprises any system, server, or function operable to control overall charging for calls in mobile network 502. Charging controller 524 processes charging rules to determine which entities share in revenue for calls in mobile network 502. Charging controller 524 then generates a separate Diameter Ro CCR for each of the revenue sharing entities, and transmits CCRs to OCS 522 to determine the cost or the amount payable to the entity.

Assume for example that an end user of mobile device 540 subscribes to a service offered by OnStar Corporation, which is an in-vehicle service providing in-vehicle security, hands free calling, turn-by-turn navigation, remote diagnostics, etc. OnStar may be considered an MVNO in this example. OnStar leases its mobile services from mobile network 502, which is operated by Verizon Wireless (or some other mobile service provider). Verizon Wireless may thus be considered the MNO for the end user in this example. Assume further that the end user of mobile device 540 places a call (through the OnStar service) to another end user. The called end user subscribes to a service offered by another service provider, such as Vodafone in England. Vodafone may thus be considered the MNO for the called end user in this example.

Figure 6:
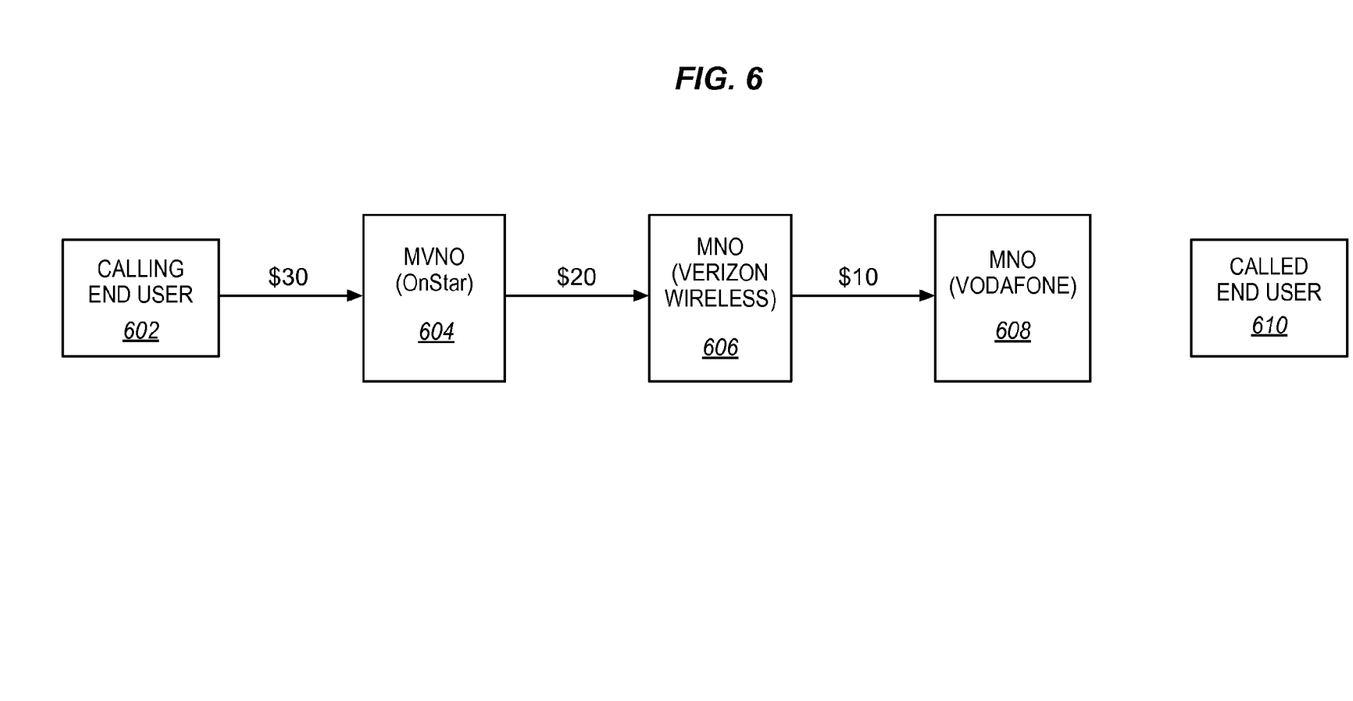
FIG. 6 illustrates how the revenue for a call is divided among entities in an exemplary embodiment.
Figure 7:
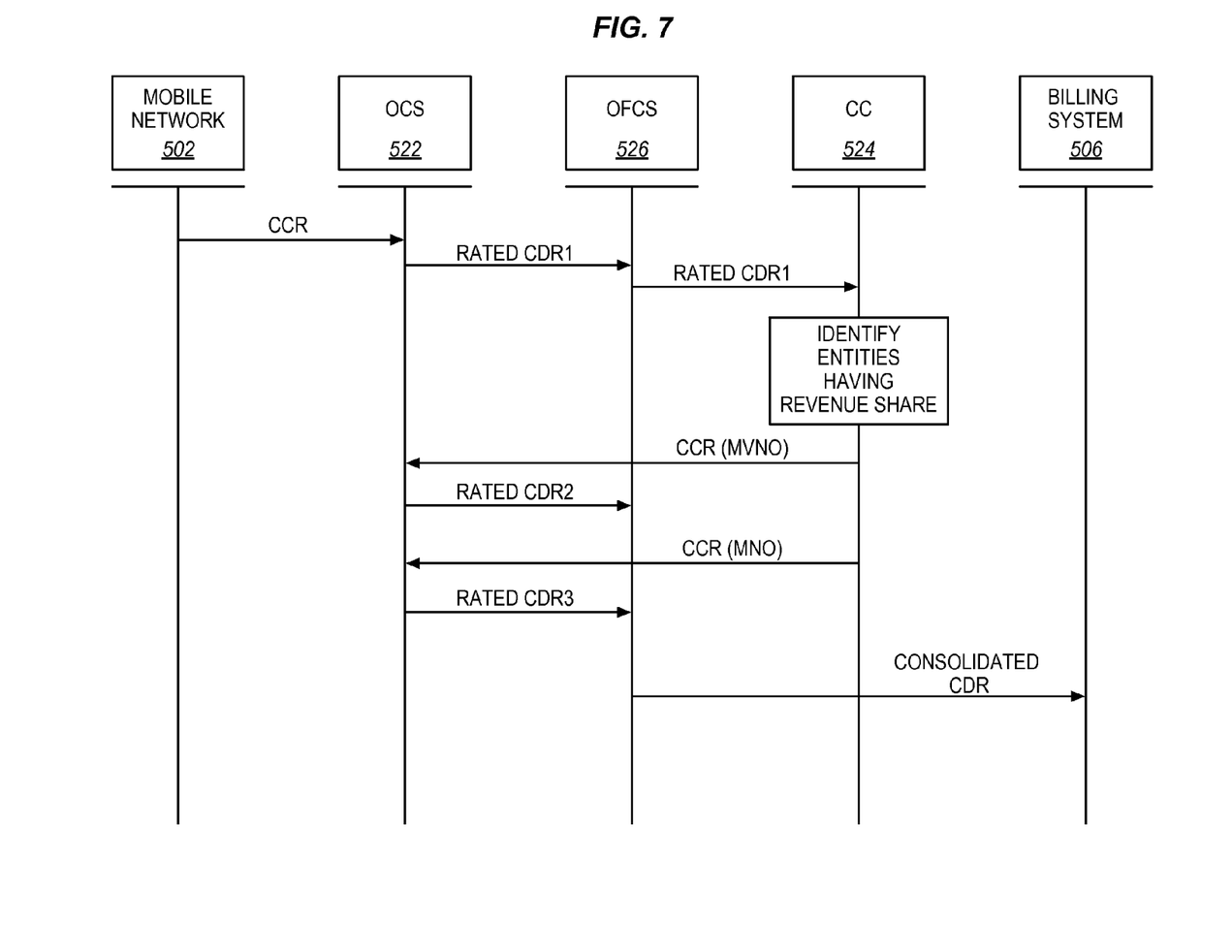
FIG. 7 is a message diagram illustrating how revenue for a call is divided in an exemplary embodiment.

Assume further that the overall charge for the call from the calling end user to the called end user is $30, and that the calling end user is responsible for payment for the call. FIG. 6 illustrates how the revenue for the call is divided among the entities in an exemplary embodiment. According to the retail agreement between the calling end user 602 and OnStar (MNVO 604), calling end user 602 pays $30 to MVNO 604 for the call. This is an example of retail charging. MVNO 402 (OnStar) leases its mobile services from Verizon Wireless (MNO 606). According to the wholesale agreement between MVNO 604 and MNO 606, MVNO 604 pays $20 to MNO 606 for the mobile services. This is an example of wholesale charging. To connect the call to called end user 610, MNO 606 needs to connect to a foreign network operated by Vodafone (MNO 608). According to the interconnect agreement between MNO 606 and MNO 608, MNO 606 pays $10 to MNO 608 for the interconnect fees. This is an example of interconnect charging. Thus, the revenue for the call is divided between MVNO 604 (OnStar), MNO 606 (Verizon Wireless), and MNO 608 (Vodafone). In the embodiments provided herein, the dividing of the revenue is performed in the charging system instead of in back office systems. FIG. 7 further illustrates how this is done.

FIG. 7 is a message diagram illustrating how revenue for a call is divided in an exemplary embodiment. Mobile network 502 transmits a Diameter Ro CCR to OCS 522. The CCR includes charging data for the call in mobile network 502, such as a calling party number, a called party number, time stamps, etc. Although a Diameter Ro CCR is received in this example, other charging messages may be received in other examples, such as INAP messages. OCS 522 processes a subscription ID (subscription ID=MSISDN of the end user of mobile device 540) to access to the account profile for the end user. OCS 522 then calculates the overall charge for the call, which is $30 that is owed from the end user to OnStar. OCS 522 also generates a rated CDR (CDR1) indicating the call charge of $30, and sends the rated CDR to a mediation device (such as CDF or CGF) in OFCS 526. OFCS 526 then sends the rated CDR to charging controller (CC) 524. Those skilled in the art will appreciate that OCS 522 may send the rated CDR to charging controller (CC) 524 directly.

In response to receiving the rated CDR having charging data for the call, charging controller 524 processes charging rules to identify which entities are entitled to share in the revenue for the call. The following illustrates some exemplary rules for the different types of charging that may apply to the call.

Retail Rules:

Rule 1: CDR is not rated AND calling party number belongs to local operator AND call direction=originated call THEN:

Retail chargeable entity=calling party;

Trigger a Diameter Ro CCR [subscription ID=MSISDN of calling party, subscription type=retail charging, . . . ] to OCS to determine the call cost for the calling party.

Rule 2: CDR is not rated AND called party number belongs to local operator AND call direction=terminate call AND subscriber location in home zone THEN:

Terminated local call is free to hear/accept;

Set the CDR as free call.

Rule 3: CDR is not rated AND called party number belongs to local operator AND call direction=terminate call AND subscriber location in roaming zone THEN:

Retail chargeable entity=called party

Trigger a Diameter Ro request [Subscription ID=MSISDN of called party, Subscription Type=retail charging, . . . ] to OCS to determine the call cost for the called party.

Wholesale Rules:

Rule 1: Calling party number belongs to local operator AND call direction=originated call AND the prefix number of the calling party number is an MVNO call number THEN:

Map out the MVNO ID based on prefix number of the calling party number;
　　Wholesale chargeable entity=MVNO;
　　Trigger a Diameter Ro CCR [Subscription ID=MVNO ID, Subscription Type=wholesale charging, . . . ] to OCS to determine the call cost for the MVNO.

Rule 2: Called party number belongs to local operator AND call direction=terminated call AND the prefix number of the called party number is an MVNO call number AND subscriber location in roaming zone THEN:

Map out the MVNO ID based on prefix number of the called party number;
　　Wholesale chargeable entity=MVNO;
　　Trigger a Diameter Ro CCR [Subscription ID=MVNO ID, Subscription Type=wholesale charging, . . . ] to OCS to determine the call cost for the MVNO.

Interconnect Rules:

Rule 1: Calling party number belongs to the local operator AND called party number doesn't belong to local operator AND call direction=originated call THEN:

Map out the Interconnect Partner ID based on prefix number of the called party number;
　　Interconnect Partner entity=Interconnect Operator ID;
　　Trigger a Diameter Ro CCR [Subscription ID=Interconnect Operator ID, Subscription Type=interconnect charging, . . . ] to OCS to determine the call cost for the interconnect partner.

Roaming Rules:

Rule 1: Calling party number doesn't belong to the local operator AND calling party's visited PLMN belongs to local operator THEN:

Map out the Inbound Partner ID based on prefix number of the calling party number;
　　Inbound Partner entity=Inbound Partner ID;
　　Trigger a Diameter Ro CCR [Subscription ID=Inbound Partner ID, subscription type=inbound roaming charging, . . . ] to OCS to determine the call cost for inbound roaming partner.

Content Rules:

Rule 1: Calling party number belongs to the local operator AND (Service ID=xxx OR Merchant ID=yyy OR Content Provider=zzz) THEN:

Map out the Content Provider ID based on Service ID, Content ID, or Merchant ID;
　　Trigger a Diameter Ro CCR [Subscription ID=Content Provider ID, subscription type=content revenue sharing charging, . . . ] to OCS to determine the call cost for the content provider.

In this example, charging controller 524 processes the wholesale rules and the prefix number of mobile device 540 that is included in the CDR. Based on the wholesale rules, charging controller 524 determines that this is an MVNO number of Verizon Wireless. Thus, charging controller 524 maps out the MVNO ID based on IMSI prefix, wherein the MVNO ID is the identifier for OnStar. Charging controller 524 then transmits a Diameter Ro CCR (with subscription ID=MVNO ID) to OCS 522.

OCS 522 uses the MVNO ID in the CCR to access the OnStar account profile in profile database 533. OCS 522 then determines the call charge for the MVNO, which is the amount OnStar pays to Verizon Wireless ($20). OCS 522 then generates the rated CDR (CDR2) that includes the wholesale charge amount of $20, and transmits the rated CDR to OFCS 526.

Charging controller 524 also processes the interconnect rules and the prefix number of called party number in the CDR. Based on the interconnect rules, charging controller 524 determines that the call is an interconnect call. Charging controller 524 maps out the MNO ID based on called party number prefix, wherein in MNO ID is the identifier for Vodafone. Charging controller 524 then transmits a Diameter Ro CCR (with subscription ID=MNO ID) to OCS 522.

OCS 522 uses the MNO ID in the CCR to access the Vodafone account profile in profile database 533. OCS 522 then determines the call charge for the MNO, which is the amount Verizon Wireless pays to Vodafone ($10). OCS 522 then generates the rated CDR (CDR3) that includes the interconnect charge amount of $10, and transmits the rated CDR to OFCS 526.

OFCS 526 correlates the three rated CDRs to generate a consolidated CDR that indicates the revenue share amount for each of the entities. In this example, the consolidated CDR indicates the retail charge of $30, the wholesale charge of $20, and the interconnect charge of $10. The consolidated CDR includes the new set of data for each revenue sharing entity, such as entity ID, charging type, and revenue share amount. OFCS 526 then transmits the consolidated CDR to billing system 506. Although OFCS 526 is shown as correlating the CDRs in this embodiment, charging controller 524 may correlate the CDRs in other embodiments.

Billing system 506 may then perform a settlement process based on the data included in the consolidated CDR to generate billing invoices and generate vouchers or credits for each revenue sharing entity. In the above example, Verizon Wireless will receive a $20 voucher from OnStar, and Vodafone will receive a $10 voucher from Verizon Wireless for this call. Because charging controller 524 has already divided the revenue for the call in the consolidated CDR, billing system 506 does not need to perform this process. Billing system 506 only needs to issue the vouchers to the proper entities for the revenue share amounts indicated in the consolidated CDR.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A charging system comprising:
a charging controller that comprises a hardware element coupled to an Offline Charging System (OFCS) and an Online Charging System (OCS) over Diameter interfaces;
the OCS comprises a server that provides an online charging function (OCF), an Account Balance Management Function (ABMF), and a common rating engine that is shared by the OCS and the OFCS;
the OCS, through the server, receives charging data for a call over a mobile network, calculates an overall charge for the call, and generates a first rated Charging Data Record (CDR) for the call indicating the overall charge;
the charging controller, through the hardware element, receives the first rated CDR for the call, processes the first rated CDR and charging rules to identify entities that have a share in revenue of the overall charge for the call, generates a charging request message for each of the entities having a revenue share in the call, and transmits the charging request messages to the OCS over one of the Diameter interfaces;
the OCS, through the server, receives the charging request messages from the charging controller, identifies a profile for each of the entities having a revenue share, determines a revenue share amount for each of the entities based on their profile and a rating provided by the common rating engine, and generates a second rated CDR for each of the entities having a revenue share;
wherein the second rated CDRs each indicate an identifier for an entity having a revenue share, and a revenue share amount indicating a monetary amount owed by the entity or payable to the entity.

2. The charging system of claim 1 wherein:
the OFCS receives the second rated CDRs for each of the entities having a revenue share from the OCS, correlates the second rated CDRs to generate a consolidated CDR that indicates the revenue share amount for each of the entities, and transmits the consolidated CDR to a billing system.

3. The charging system of claim 1 wherein:
the second rated CDRs each indicate a charging type for the call, wherein the charging type is selected from retail charging, wholesale charging, content charging, interconnect charging, and roaming charging.

4. The charging system of claim 3 wherein:
for retailing charging, the revenue share amount represents service units an end user pays to a Mobile Network Operator (MNO) or a Mobile Virtual Network Operator (MVNO);
for wholesale charging, the revenue share amount represents service units the MVNO pays to the MNO for network usage;
for content charging, the revenue share amount represents service units the MNO pays for the content supplied by a content provider;
for interconnect charging, the revenue share amount represents service units the MNO pays to another network operator that interconnects the call; and
for roaming charging, the revenue share amount represents service units a visiting MNO pays to a visited MNO for a local user to roam in a foreign network.

5. The charging system of claim 1 wherein:
the OCS, through the server, determines a subscription ID for each of the entities having a revenue share, and inserts the subscription ID in a corresponding charging request message.

6. The charging system of claim 1 wherein the charging rules include retail rules defining conditions for retail charging.

7. The charging system of claim 1 wherein the charging rules include wholesale rules defining conditions for wholesale charging.

8. The charging system of claim 1 wherein the charging rules include interconnect rules defining conditions for interconnect charging.

9. The charging system of claim 1 wherein the charging rules include content rules defining conditions for content charging.

10. The charging system of claim 1 wherein the charging rules include roaming rules defining conditions for roaming charging.

11. A method of determining the share of call revenue for a call in a charging system, wherein the charging system includes a charging controller comprising a hardware element coupled an Offline Charging System (OFCS) and an Online Charging System (OCS) over Diameter interfaces, the method comprising:
receiving, in a server of the OCS, charging data for a call in the mobile network, wherein the server provides an online charging function (OCF), an Account Balance Management Function (ABMF), and a common rating engine that is shared by the OCS and the OFCS;
calculating an overall charge for the call in the server of the OCS;
generating, at the server of the OCS, a first rated Charging Data Record (CDR) for the call indicating the overall charge;
receiving the first rated CDR for the call in the charging controller;
processing, at the hardware element of the charging controller, the first rated CDR and charging rules to identify entities that have a share in revenue of the overall charge for the call;
generating, at the hardware element of the charging controller, a charging request message for each of the entities having a revenue share in the call;
transmitting the charging request messages from the charging controller to the OCS over one of the Diameter interfaces;
receiving the charging request messages in the server of the OCS from the charging controller;
identifying, at the server of the OCS, a profile for each of the entities having a revenue share;
determining, at the server of the OCS, a revenue share amount for each of the entities based on their profile; and
generating, at the server of the OCS, a second rated CDR for each of the entities having a revenue share;
wherein the second rated CDRs each indicate an identifier for an entity having a revenue share, and a revenue share amount indicating a monetary amount owed by the entity or payable to the entity.

12. The method of claim 11 further comprising:
receiving, at the OFCS, the second rated CDRs for each of the entities having a revenue share from the OCS;

correlating, at the OFCS, the second rated CDRs to generate a consolidated CDR that indicates the revenue share amount for each of the entities; and transmitting the consolidated CDR from the OFCS to a billing system.

13. The method of claim 12 wherein:

the second rated CDRs each indicate a charging type for the call, wherein the charging type is selected from retail charging, wholesale charging, content charging, interconnect charging, and roaming charging.

14. The method of claim 13 wherein:

for retailing charging, the revenue share amount represents service units an end user pays to a Mobile Network Operator (MNO) or a Mobile Virtual Network Operator (MVNO);

for wholesale charging, the revenue share amount represents service units the MVNO pays to the MNO for network usage;

for content charging, the revenue share amount represents service units the MNO pays for the content supplied by a content provider;

for interconnect charging, the revenue share amount represents service units the MNO pays to another network operator that interconnects the call; and for roaming charging, the revenue share amount represents service units a visiting MNO pays to a visited MNO for a local user to roam in a foreign network.

15. The method of claim 11 wherein generating a charging request message for each of the entities having a revenue share comprises:

determining, at the server of the OCS, a subscription ID for each of the entities having a revenue share; and inserting, at the server of the OCS, the subscription ID in a corresponding charging request message.

16. The method of claim 11 wherein the charging rules include retail rules defining conditions for retail charging.

17. The method of claim 11 wherein the charging rules include wholesale rules defining conditions for wholesale charging.

18. The method of claim 11 wherein the charging rules include interconnect rules defining conditions for interconnect charging.

19. The method of claim 11 wherein the charging rules include content rules defining conditions for content charging.

20. The method of claim 11 wherein the charging rules include roaming rules defining conditions for roaming charging.

* * * * *